(12) United States Patent
Makita et al.

(10) Patent No.: US 8,563,681 B2
(45) Date of Patent: Oct. 22, 2013

(54) PROCESS FOR PRODUCING FINE POLYPHENYLENE SULFIDE RESIN PARTICLES, FINE POLYPHENYLENE SULFIDE RESIN PARTICLES, AND DISPERSION THEREOF

(75) Inventors: Kei Makita, Nagoya (JP); Takae Ono, Nagoya (JP); Toshiya Takahashi, Nagoya (JP); Hiroaki Akasaka, Nagoya (JP); Tomohiro Sakane, Nagoya (JP)

(73) Assignee: Toray Industries, Inc., Tokyo (JP)

( * ) Notice: Subject to any disclaimer, the term of this patent is extended or adjusted under 35 U.S.C. 154(b) by 351 days.

(21) Appl. No.: 12/933,635

(22) PCT Filed: Mar. 23, 2009

(86) PCT No.: PCT/JP2009/055572
§ 371 (c)(1),
(2), (4) Date: Sep. 20, 2010

(87) PCT Pub. No.: WO2009/119466
PCT Pub. Date: Oct. 1, 2009

(65) Prior Publication Data
US 2011/0020647 A1 Jan. 27, 2011

(30) Foreign Application Priority Data

Mar. 28, 2008 (JP) ................................. 2008-088860
Mar. 28, 2008 (JP) ................................. 2008-088862
Mar. 28, 2008 (JP) ................................. 2008-088863
Sep. 30, 2008 (JP) ................................. 2008-253344

(51) Int. Cl.
*C08G 64/00* (2006.01)
*C08G 63/02* (2006.01)
(52) U.S. Cl.
USPC ........................................ 528/481; 528/480

(58) Field of Classification Search
USPC ................................................. 528/481, 480
See application file for complete search history.

(56) References Cited

U.S. PATENT DOCUMENTS

2009/0041968 A1   2/2009   Saitoh et al.

FOREIGN PATENT DOCUMENTS

| JP | 59-49232 A | 3/1984 |
| JP | 2-160839 A | 6/1990 |
| JP | 2-163126 A | 6/1990 |
| JP | 6-298937 A | 10/1994 |
| JP | 8-169958 A | 7/1996 |
| JP | 10-273594 A | 10/1998 |
| JP | 2003-183406 A | 7/2003 |
| JP | 2007-154166 A | 6/2007 |
| WO | WO 2006/091935 A1 | 8/2006 |
| WO | WO 2007/108384 A1 | 9/2007 |

OTHER PUBLICATIONS

International Search Report dated Jun. 9, 2009 in International Application No. PCT/JP2009/055572.

*Primary Examiner* — Terressa Boykin
(74) *Attorney, Agent, or Firm* — Birch, Stewart, Kolasch & Birch, LLP (57) ABSTRACT

This invention provides a process for producing fine PPS resin particles and dispersion thereof by industrially applicable simple operation. This invention further provides very fine PPS resin particles, and furthermore provides fine PPS resin particles uniform in particle size. This invention is a process for producing fine polyphenylene sulfide resin particles comprising the following steps (a) and (b); (a) a step of heating a polyphenylene sulfide resin in an organic solvent, for obtaining a solution with the polyphenylene sulfide resin dissolved therein (dissolution step) (b) a step of flushing-cooling the aforementioned solution, for precipitating the fine particles of the polyphenylene sulfide resin (precipitation step).

21 Claims, 1 Drawing Sheet

PROCESS FOR PRODUCING FINE POLYPHENYLENE SULFIDE RESIN PARTICLES, FINE POLYPHENYLENE SULFIDE RESIN PARTICLES, AND DISPERSION THEREOF

TECHNICAL FIELD

The present invention relates to process for producing fine polyphenylene sulfide resin particles, fine polyphenylene sulfide resin particles, and dispersion thereof

BACKGROUND ART

Polyphenylene sulfide (hereinafter may be abbreviated as PPS) resins have properties suitable for engineering plastics such as excellent heat resistance, chemicals resistance, solvent resistance and electric insulation, and are used mainly for injection molding and extrusion, to be used as various electric and electronic parts, mechanical parts, automobile parts, etc. As resins with such various excellent properties and dispersions thereof, there is a high demand for fine PPS resin particles and dispersions thereof in the paint field, adhesive material field, polymer compound field, etc., but they are presently very difficult to obtain owing to the technical restrictions described below.

As processes for obtaining fine PPS resin particles, several processes as described below are proposed. Patent Document 1 discloses a process for obtaining fine PPS resin particles relatively controlled in particle size by controlling the water content and the vapor phase temperature in the reaction system for producing a PPS polymer. The fine PPS resin particles obtained by this process range from tens of micrometers to hundreds of micrometers in average particle size. Further, Patent Document 2 describes spherical fine PPS particles ranging from 0.1 µm to 100 µm in average particle size, and a production process thereof. The particularly disclosed production process for obtaining the spherical fine PPS resin particles comprises the steps of forming a resin composition with an islands-in-sea structure with PPS as islands and another thermoplastic polymer as sea, and subsequently dissolving and washing away the sea phase. Even this process can provide only relatively large fine particles ranging from several micrometers to tens of micrometers. Furthermore, Patent Document 3 discloses a process comprising the step of wet-grinding a resin dispersed in surfactant-containing water by a grinder such as a vibrating ball mill, to obtain a resin-based powder. This patent document does not particularly disclose the grinding of a PPS resin, and the obtained resin powder is as large as about 5 to 50 µm in average particle size. It is difficult to obtain fine particles of 1 µm or less by merely wet-grinding a resin.

Since the fine PPS resin particles obtained by the prior art are larger than several micrometers as described above, it is difficult to obtain a stable dispersion thereof. In order to obtain a stable dispersion, it is necessary to obtain fine PPS resin particles smaller in particle size. However, any process for obtaining the fine PPS resin particles of 1 µm or less, i.e., sub-micron size necessary for obtaining a stable fine PPS resin particle dispersion and any process for simply and efficiently obtaining the dispersion are not yet established, it is strongly desired to develop practical production processes for obtaining such fine PPS resin particles and a dispersion thereof.

[Patent Document 1] JP 6-298937 A (claim 1)
[Patent Document 2] JP 10-273594 A (Examples 1 and 2)
[Patent Document 3] JP 2003-183406 A (claim 1, "Modes for Carrying Out the Invention")

DISCLOSURE OF THE INVENTION

Problem to be Solved by the Invention

This invention addresses the problem of providing fine polyphenylene sulfide resin particles by industrially applicable and simple operation, and providing a process for producing a dispersion thereof.

Means for Solving the Problem

The present inventors made an intensive study for solving the abovementioned problem, and as a result, surprisingly found that if a PPS resin dissolved in an organic solvent is flush-cooled, fine PPS resin particles can be obtained. Further, the present inventors found a process for producing an aqueous dispersion of fine PPS resin particles directly by extracting a solvent from the obtained fine PPS resin particles, and also found that if the fine PPS resin particles obtained by flush cooling are mechanically ground or mechanically dispersed, a dispersion with finer PPS resin particles can be produced. Thus, the present invention has been completed.

This invention is a process for producing fine polyphenylene sulfide particles, comprising the following steps (a) and (b):

(a) A step of heating a polyphenylene sulfide resin in an organic solvent, for obtaining a solution with the polyphenylene sulfide dissolved therein (dissolution step)

(b) A step of flush-cooling the aforementioned solution, for precipitating the fine particles of the polyphenylene sulfide resin (precipitation step).

This invention also provides fine polyphenylene sulfide resin particles with an average particle size of 0.5 µm or less as measured by a laser diffraction/light scattering method and with a variation coefficient of 20 to 100%, and a dispersion with the fine polyphenylene sulfide resin particles dispersed therein.

Effect of the Invention

This invention can be used to simply produce a fine PPS resin particle dispersion that has been industrially difficult to obtain, and can provide an industrially widely useful material.

THE BEST MODES FOR CARRYING OUT THE INVENTION

Figure 1:
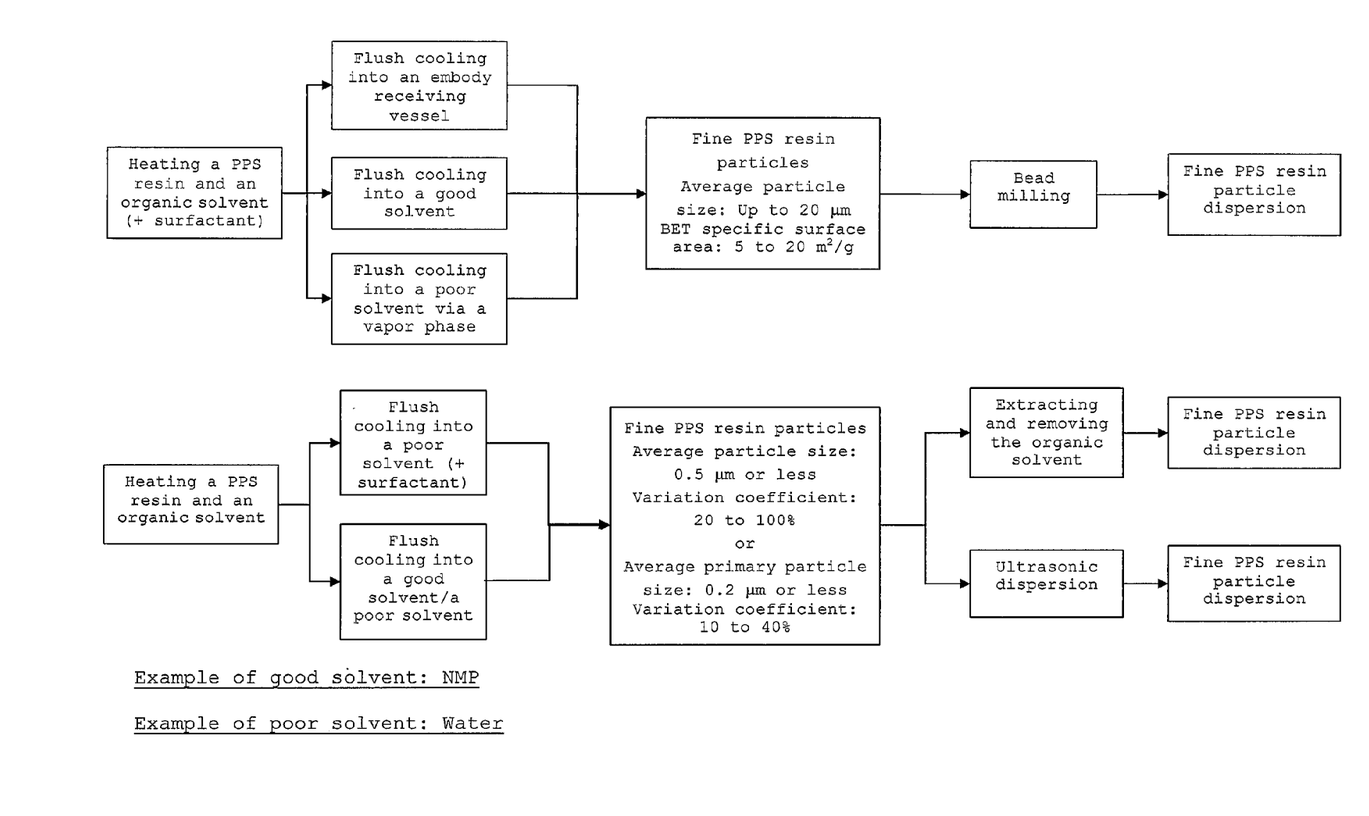
FIG. 1 is a diagram for explaining the process for producing fine polyphenylene sulfide resin particles of this invention.

Modes for carrying out the invention are explained below in detail.

[PPS Resin as the Raw Material]

The PPS resin of this invention is a homopolymer or copolymer having the recurring units represented by the following chemical formula (1):

[Chemical formula 1]

(1)

as major building blocks. In the formula, Ar can be represented by any of the following chemical formulae (2) to (4):

[Chemical formula 2]

(2)

(3)

(4)

(where $R^1$ and $R^2$ denote, respectively independently, a group selected from hydrogen, alkyl group, alkoxyl group and halogen group). Only if the PPS resin has the recurring units as major building blocks, the PPS resin can contain the branch links or crosslinks represented by the following chemical formula (5), etc., and also a copolymerization component represented by the following chemical formulae (6) to (14) ($R^1$ and $R^2$ denote, respectively independently, a group selected from hydrogen, alkyl group, alkoxyl group and halogen group) by 30 mol % or less, preferably 10 mol % or less.

[Chemical formula 3]

(5)

[Chemical formula 4]

(6)

(7)

(8)

(9)

(10)

(11)

(12)

(13)

(14)

As the PPS resin, a PPS containing 70 mol % or more, especially 90 mol % or more of the p-phenylene sulfide represented by the following chemical formula (15):

[Chemical formula 5]

(15)

as the major building blocks of the polymer can be especially preferably used. As such a PPS, a PPS synthesized by a usually used method from an aromatic dihalogen compound and an alkali metal sulfide in an N-alkylamide solvent can be used. For example, there is a PPS with a relatively low molecular weight obtained by the production process described in JP 45-3368 B, and there is a method for enhancing the polymerization degree of it by heating in oxygen atmosphere or adding a crosslinking agent such as a peroxide and heating. Further, an essentially linear PPS with a high molecular weight produced by the production process described in JP 52-12240 B can be preferably used.

In order to produce fine PPS resin particles with high quality, a PPS resin as small as possible in inorganic ion content is especially preferred. For this purpose, it is preferred to use the abovementioned PPS resin after removing byproducts such as an inorganic salt by a method of washing, etc. The washing method can be a usually used method. As for the time when the byproducts are removed, they can be removed after completion of polymerization or in any of the steps described later. However, it is preferred to remove the byproducts before the dissolution step described later. Meanwhile, the above-mentioned PPS resin remaining after removing the byproducts may be washed or treated by a metal aqueous solution in order to control crystallization rate. For example, JP 10-60113 A discloses a production process of a PPS resin lowered in metal ion content by washing using an inorganic acid and/or organic acid with a pH of less than 7. Further, JP 2002-332351 A discloses a treatment method using an aqueous solution containing a metal element of group II of the periodic table. The PPS resin used in this invention can be the abovementioned PPS resin remaining after removing the byproducts by an ordinary washing method after polymerization, the PPS resin washed with an acid or the PPS resin treated by an aqueous solution containing a metal element of group II of the periodic table. Furthermore, the PPS resins synthesized by the processes described in U.S. Pat. No. 5,869,599 and WO 07/034,800 can also be used.

[Production of Fine PPS Resin Particles]

The fine PPS resin particles of this invention can be produced by letting any of the abovementioned PPS resins undergo a process comprising the following steps (a) and (b).
(a) A step of heating a polyphenylene sulfide resin in an organic solvent, for obtaining a solution with the polyphenylene sulfide resin dissolved therein (dissolution step)
(b) A step of flush-cooling the aforementioned solution, for precipitating the fine particles of the polyphenylene sulfide resin (precipitation step).

Further, the PPS resin can be made to undergo any of the following steps (c) through (e).
(c) A step of extracting and removing the organic solvent only from the dispersion containing precipitated fine polyphenylene sulfide resin particles, water and the organic solvent (extraction step)
(d) A step of mechanically grinding the suspension containing the precipitated fine polyphenylene sulfide resin particles, surfactant and dispersion medium (grinding step)
(e) A step of mechanically dispersing the suspension containing the precipitated fine polyphenylene sulfide resin particles, surfactant and dispersion medium (dispersion step)

[Dissolution Step]

In this invention, in the dissolution step, a PPS resin is heated in an organic solvent, to be dissolved. The mode of the PPS resin used in this invention is not especially limited, and particular modes include powder, granules, pellets, fibers, film, molded article, etc. In view of operation convenience and short time taken for dissolution, powder, granules or pellets are desirable, and especially a powdery PPS resin is preferred. In this case, in order to prevent that the equipment is corroded by the inorganic ions coexisting in the case where the intended fine PPS resin particles or the dispersion thereof is used for a water-soluble coating material or the like, a powdery, granular or pelletized PPS resin not containing inorganic ions is especially preferred.

As the organic solvent used in this step, any solvent capable of dissolving the PPS resin can be used. Particularly at least one of the following can be used: alkylhalogenated compounds such as chloroform, aromatic halogenated compounds such as o-dichlorobenzene and 1-chloronaphthalene, N-alkylpyrrolidones such as N-methyl-2-pyrrolidinone (hereinafter abbreviated as NMP), N-alkylcaprolactams such as N-methyl-ε-caprolactam, polar solvents such as 1,3-dimethyl-2-imidazolidinone, N,N-dimethylacetamide, N,N-dimethylformamide (hereinafter abbreviated as DMF), hexamethylphosphoric triamide, dimethyl sulfoxide (hereinafter abbreviated as DMSO), dimethylsulfone and tetramethylene sulfone. Among them, in view of the solubility of the PPS resin and easiness of solvent exchange in the production of aqueous dispersion, NMP is especially preferred.

If the PPS resin partially remains undissolved or molten at a predetermined temperature, the undissolved or molten resin becomes coarse particles or lumps after flush cooling and they exist in the flush-cooled liquid, but they can be easily removed by any operation such as filtration or centrifugal separation. Therefore, the concentration of the PPS resin in the abovementioned organic solvent is not especially limited. Usually 0.1 to 10 parts by mass, preferably 0.5 to 10 parts by mass of a PPS resin are used per 100 parts by mass of an organic solvent. The concentration in this range can be applied to industrial production. In this invention, the PPS resin is dissolved into the aforementioned solvent, and the mixture is heated for dissolution. Subsequently the PPS resin solution is flush-cooled into a vapor phase or into a solvent for precipitating fine PPS resin particles.

Further, in the dissolution step, a surfactant or the like capable of being uniformly dissolved in the solution can also be added. The surfactant added is only required to be dissolved in the organic solvent used. The surfactant can be a cationic surfactant, anionic surfactant, amphoteric surfactant or nonionic surfactant.

Examples of the anionic surfactant include fatty acid sodium salts, fatty acid potassium salts, sodium alkylbenzenesulfonates, sodium alkylnaphthalenesulfonates, sodium alkylsulfates, sodium alkylsulfonates, sodium alkyl-ethersulfates, monoalkyl phosphoric acid esters, sodium polyoxyethylene alkyl ether phosphates, fatty acid ester sodium sulfonates, fatty acid ester sodium sulfates, fatty acid alkylose amide sodium sulfates, fatty acid amide sodium sulfates, etc.

Examples of the cationic surfactant include alkyl methyl ammonium chlorides, alkyl trimethyl ammonium chlorides, dialkyl dimethyl ammonium chlorides, alkyl dimethyl benzyl ammonium chlorides, alkyl pyridinium chlorides, etc.

Examples of the amphoteric surfactant include alkylaminocarboxylic acid salts, carboxybetaines, alkylbetaines, sulfobetaines, phosphobetaines, etc.

Examples of the nonionic surfactant include sucrose fatty acid esters, polyoxyethylene fatty acid esters, polyoxyethylene lanolin fatty acid esters, polyoxyethylene sorbitan fatty acid esters, polyoxyethylene glycol mono-fatty acid esters, polyoxyethylene alkyl phenyl ethers, polyoxyethylene monobenzyl phenyl ether, polyoxyethylene dibenzyl phenyl ether, polyoxyethylene tribenzyl phenyl ether, polyoxyethylene monostyryl phenyl ether, polyoxyethylene distyryl phenyl ether, polyoxyethylene tristyryl phenyl ether, polyoxyethylene biphenyl ether, polyoxyethylene phenoxy phenyl ether, polyoxyethylene cumyl phenyl ether, polyoxyethylene alkyl ethers, fatty acid alkanolamides, fatty acid monoethanolamides, fatty acid diethanolamides, fatty acid triethanolamides, polyoxyethylene fatty acid amides, isopropanolamides, alkylamine oxides, polyoxyethyleneamine, etc.

Meanwhile, the examples of the abovementioned alkyl include straight chain saturated hydrocarbon groups and branched saturated hydrocarbon groups respectively with 1 to 30 carbon atoms. Instead of the alkyl, a straight chain unsaturated hydrocarbon group or branched unsaturated hydrocarbon group can also be used.

The amount of the surfactant used is 0.01 to 5 times, preferably 0.01 to 1 time the mass of the supplied PPS resin.

The atmosphere in the vessel of the dissolution step can be any of air atmosphere, inert gas atmosphere or solvent vapor atmosphere, but for inhibiting the decomposition and deterioration of the PPS resin and for assuring safe work, it is preferred to keep the oxygen gas concentration low. Examples of the inert gas include nitrogen gas, carbon dioxide gas, helium gas, argon gas, etc. Considering economy and availability, nitrogen gas, argon gas and carbon dioxide gas are preferred, and nitrogen gas or argon gas can be especially preferably used. Further, the methods of forming a solvent vapor atmosphere include (1) a method of reducing the pressure of or evacuating the reaction vessel, for removing air, and subsequently heating the reaction vessel, (2) a method of sucking the air in the reaction vessel while heating, and stopping the suction when the reaction vessel is filled with the solvent vapor, (3) a method of sucking the air in the reaction vessel and stopping the suction when the reaction vessel is filled with the solvent vapor, (4) a method of sucking the air in the reaction vessel while blowing the vapor of the solvent into the reaction vessel, and a method of combining any of these methods. By using any of these methods, the dissolution vessel can be filled with an atmosphere of the vapor obtained by gasifying the solvent. Meanwhile, in the case where any of methods (2) to (4) is employed, it is desirable to identify the amount of the solvent in the dissolution vessel.

The dissolving method is not especially limited, but a PPS resin and a solvent are placed in a predetermined vessel, and are heated with stirring. In order to produce fine PPS resin particles with a uniform particle size, a method of perfectly dissolving the PPS resin in the solvent and subsequently flush-cooling for precipitation is preferred. However, an undissolved PPS resin or a molten PPS resin may also exist. The PPS resin can be dissolved at the boiling point of the solvent, and the diluted solution can be used for precipitation. However, since the solubility of a PPS resin in an organic solvent is low, a method of heating in a pressure vessel such as an autoclave at a temperature of higher than the boiling point of the solvent to lower than the decomposition point of the PPS resin is preferred.

The dissolving temperature varies depending on the solvent used and the concentration of the PPS resin, but is usually 200° C. to 400° C., preferably 220° C. to 320° C. If the temperature is too high, the PPS resin is decomposed, and if the temperature is lower than 200° C., a large amount of a solvent is used for dissolving the PPS resin.

The dissolving time varies depending on the solvent used, the concentration of the PPS resin and the dissolving temperature, but is usually 10 minutes to 10 hours, preferably 20 minutes to 8 hours, more preferably 30 minutes to 5 hours.

By the abovementioned operation, the PPS resin can be dissolved. In this case, if the PPS resin is dissolved in a pressure vessel such as an autoclave, whether or not there is an undissolved resin or a molten resin exists in the pressure vessel may not be able to be directly confirmed as the case may be owing to a structural reason of instrument. However, in the case where the fine particles precipitated in the precipitation step performed in succession are significantly different from the PPS resin not yet dissolved in shape, particle size, etc., the fine particles can be decided to be the result obtained by the dissolution and precipitation of the present invention. The change in shape and particle size by the dissolution and precipitation can be determined in reference to the change of the average particle size found by using a particle size distribution meter and to the change of the shape found by SEM.

[Precipitation Step]

The PPS resin solution obtained by the above-mentioned dissolution step is flush-cooled into a vapor phase or into a solvent for precipitating fine PPS resins, to precipitate the fine PPS resin particles. In this invention, the flush cooling refers to a method of quickly cooling the abovementioned solution by flushing the heated and pressurized solution into another vessel (hereinafter may also be referred to as a receiving vessel as the case may be) at lower than the boiling point of the organic solvent used in the dissolution step (or under cooling) at lower than the pressurization pressure (or under reduced pressure) via a nozzle, using the cooling effect due to pressure difference and the cooling effect due to latent heat.

Particularly it is preferred to flush-cool the PPS resin solution from a heated and pressurized vessel into a receiving vessel kept at atmospheric pressure (or under reduced pressure). For example, if the dissolution in the aforementioned dissolution step is performed in a pressure vessel such as an autoclave, the heating in the vessel produces a pressure for keeping the vessel internally pressurized. If the pressure in this state is released into the receiving vessel of atmospheric pressure, the flush cooling can be performed further more simply. Meanwhile, the flush cooling into a vapor phase refers to flushing into an empty receiving vessel. Further, in the case where flush cooling is performed into a solvent for precipitating fine PPS resin particles, the flush cooling can also be performed into the solvent via the vapor phase or can also be performed directly into the solvent. However, in order to obtain finer PPS resin particles, it is desirable to cool quickly, and the direct flush cooling into the solvent is more preferred since both the cooling effect due to pressure difference and the cooling effect due to latent heat can be obtained. For example, in JP 2007-154166 A, the PPS resin solution heated and dissolved in a pressure vessel is cooled with icy water together with the pressure vessel, for obtaining fine PPS resin particles, but particles as fine as only about 1 μm on the average can be obtained, and fine PPS resin particles of submicron size cannot be obtained.

The solvent for precipitating fine PPS resin particles is not especially limited, but in view of uniformly dispersing in the solvent, a solvent that can be mixed uniformly with the organic solvent used in the dissolution step is preferred. In this case, uniform mixing refers to a state where if two or more solvents are mixed, they are kept mixed uniformly without showing any interface even if the mixture is allowed to stand for one day. For example, solvents that can be homogenously mixed with water include NMP, DMF, acetone, DMSO, tetrahydrofuran, methanol, ethanol, etc. Particularly the solvent capable of dissolving the PPS resin can also be used as a solvent for precipitation, but in view of finer PPS resin particles obtained and likeliness to achieve uniform particle size, it is preferred that the solvent can be uniformly mixed with the solvent used in the dissolution step and contains a poor solvent of the PPS resin. In the case where NMP is selected as the solvent of the dissolution step, NMP, alcohol, acetone or water, etc. can be used, and a solvent for precipitation can be selected in response to each purpose. Especially since finer PPS resin particles with a uniform particle size are likely to be obtained it is preferred to use water. Further, if the solvent for precipitating fine PPS resin particles can be uniformly mixed with the organic solvent used in the dissolution step, a single solvent can be used or two or more solvents can also be used as a mixture. However, since finer particles with a uniform particle size can be easily obtained, it is preferred to use a mixed solvent containing water. Above all, a mixed solvent consisting of water and NMP is preferred.

The amount of the solvent used for precipitating fine PPS resin particles is not especially limited, and for example, the solvent can be used by 100 to 0.1 part by mass per 1 part by mass of the solvent of the dissolution step. A preferred range is 50 to 0.1 part by mass, and a more preferred range is 10 to 0.1 part by mass.

A surfactant can also be added into the solvent for precipitating fine PPS resin particles. In the case where the flush-cooled liquid obtained by using a solvent containing the surfactant is fed to the dispersion step, for obtaining a fine PPS resin particle dispersion, the effect of enhancing the long-term preservation stability can also be obtained. The surfactant to be added can be selected from the surfactants enumerated for the dissolution step, or any other surfactant can also be used. The amount of the surfactant used varies depending on the surfactant used and the purpose of use, but it is preferred that the amount of the surfactant is not larger than 2 times the mass of the fine PPS resin particles. A more preferred range is 0.01 to 1 time the mass.

The flush-cooling method is not especially limited. For example, a method of flush-cooling the solution of usually 200° C. to 400° C., preferably 220° C. to 320° C. into a vessel kept at lower than the pressurization pressure or under reduced pressure in one step, or a method of flush-cooling into a vessel kept at a pressure lower than that of the vessel containing the solution in multiple steps can be employed. For obtaining finer PPS resin particles, it is preferred that the pressure difference is larger and that the temperature difference is larger. Particularly, if a PPS resin is dissolved in a pressure vessel such as an autoclave for example in the aforementioned dissolution step, the heating in the vessel generates a pressure to keep the vessel internally pressurized. The pressurized solution is flushed into a receiving vessel kept at atmospheric pressure containing a solvent for precipitating fine PPS resin particles, or flushed into a receiving vessel kept under reduced pressure. It is preferred that the pressure (gauge pressure) of the solution to be flush-cooled is 0.2 to 4 MPa. It is preferred to flush-cool the solution from this environment preferably at atmospheric pressure, more preferably into a receiving vessel kept at atmospheric pressure.

In the case where flush-cooling into an empty receiving vessel is performed, it is preferred to keep the receiving vessel at lower than the boiling point of the organic solvent used in the dissolution step. In this case, it is more preferred to cool the receiving vessel by a coolant or icy water, since the solution can be cooled to lower than the boiling point of the organic solvent used in the dissolution step all at once for allowing finer PPS resin particles to be obtained. It is preferred that the cooling temperature of the receiving vessel is 40° C. or lower, and a more preferred range is 0 to 15° C.

In the case where the solution is flush-cooled into a solvent for precipitating fine PPS resin particles, it is preferred to cool the receiving vessel by a coolant or icy water, for cooling, in advance, the solvent for precipitating fine PPS resin particles in the receiving vessel, since the solution can be cooled to lower than the boiling point of the organic solvent used in the dissolution step all at once for allowing finer PPS resin particles to be obtained. The flush cooling causes fine PPS resin particles to be precipitated from the PPS resin solution, for providing a solution with fine PPS resin particles dispersed or suspended therein. The cooling temperature of the receiving vessel varies depending on the solvent for precipitating fine PPS resin particles, supplied into the receiving vessel, but is in a range from the temperature at which the solvent for precipitating fine PPS resin particles is not solidified, to 15° C. Particularly in the case of water, it is preferred that the temperature immediately before flush cooling is 0 to 40° C., and a more preferred range is 0 to 15° C.

The method for flush-cooling into the solvent for precipitating fine PPS resin particles can be a method in which the outlet of the pipe connected from the dissolution vessel is placed in the solvent for precipitating the fine PPS resin particles in the receiving tank, for allowing flush-cooling, or a method of flush-cooling into the solvent for precipitating fine PPS resin particles via a vapor phase. In order to obtain a dispersion of finer PPS resin particles, the flush-cooling method of placing the outlet of the connected pipe in the solvent used for precipitation is preferred.

The fine PPS resin particles produced like this can be obtained as a dispersion or suspension (hereinafter the dispersion or suspension in this state may be called the flushed liquid as the case may be). Meanwhile, if the flushed liquid contains coarse particles such as the undissolved matter of the supplied PPS resin, they can be removed by filtration, etc. Further, the fine PPS resin particle dispersion or suspension can also be used as it is as a fine PPS resin particle dispersion.

In this invention, if the PPS resin solution is flush-cooled into an empty receiving vessel or directly into a good solvent (for example, NMP) of the PPS resin or via a vapor phase, then fine PPS resin particles with an average particle size of 20 μm or less and with a BET specific surface area of 5 to 20 $m^2/g$ can be obtained. The fine PPS resin particles with an average particle size of 20 μm or less and with a BET specific surface area of 5 to 20 $m^2/g$ obtained like this is suitable for mechanical grinding. Therefore, in the case where further finer PPS resin particles are desired to be obtained, they can be mechanically ground for use as finer PPS resin particles.

Further, in this invention, if the PPS resin solution is directly flush-cooled into a poor solvent (for example, water) of the PPS resin, fine PPS resin particles with an average primary particle size of 0.2 μm or less can be obtained. The fine PPS resin particles with an average primary particle size of 0.2 μm or less obtained like this may become less fine PPS resin particles due to aggregation or flocculation as the case may be, but since they are suitable for mechanical dispersion, they can be mechanically dispersed for use as finer PPS resin particles with an average particle size of 0.5 μm or less.

[Extraction Step]

If the organic solvent used in the dissolution step is extracted and removed from the fine PPS resin particle dispersion obtained by flush-cooling the PPS resin solution into water in the abovementioned precipitation step, a fine PPS resin particle aqueous dispersion can be produced more simply. In this case, as the organic solvent used in the dissolution step, NMP is most preferred, but any other solvent that is arbitrarily miscible with water can also be used.

It is preferred that the amount of water in the receiving vessel of the precipitation step, to be fed to the extraction step is in a range from 1 to 5 parts by mass per 1 part by mass of NMP of the dissolution step, since fine PPS resin particles with an average particle size of 0.05 to 0.5 μm can be obtained. It is not preferred that the amount of water of the receiving vessel is less than 1 part by mass per 1 part by mass of NMP, since the particle size of the fine PPS resin particles increases due to cohesion, and it is not industrially preferred that the amount is more than 5 parts by mass, since the fine PPS resin particle concentration decreases.

From the dispersion containing water, NMP and fine PPS resin particles with an average particle size of 0.05 to 0.5 μm as described above, NMP is extracted using an extraction solvent. For example, the fine PPS resin particle dispersion obtained in the abovementioned precipitation step is used as it is, for extracting NMP, to obtain a fine PPS resin particle aqueous dispersion. The concentration of NMP in the fine PPS resin particle aqueous dispersion after extraction can respond to the purpose of use, and in the case where it is desired that the dispersion medium is substantially water, the concentration can also be lowered to 1 mass % or less. In order to decrease the concentration of NMP, the following extraction step can be repeated.

The extraction can be performed by a conventional method of adding an extraction solvent to the dispersion obtained in the precipitation step, stirring, allowing the solution to stand till an interface appears, and separating. The stirring speed and the stirring time are not especially limited. It is preferred that the extraction temperature is 40° C. or lower in view of the extraction efficiency and the stability of the fine PPS resin particle dispersion. The lowest limit of the temperature is only required to be higher than the temperature at which the fine PPS resin particle dispersion containing the extraction solvent is not frozen, is preferably 10° C. or higher in view of extraction efficiency. A more preferred range is 20° C. to 40° C. It is preferred that the extraction solvent is such that it can dissolve NMP at the extraction temperature and that the amount of water dissolved in 100 g of the extraction solvent is less than about 1 g at 25° C. Particularly a halogen-based solvent such as chloroform (0.08 g of water can be dissolved in 100 g of chloroform at 25° C.) or methylene chloride (0.17 g of water can be dissolved in 100 g of methylene chloride at 25° C.) can be preferably used. In view of extraction efficiency, chloroform is preferred. In the case where methylene chloride is used, in view of the boiling point of methylene chloride, it is preferred to perform the extraction at 30° C. or lower.

In this connection, surprisingly, in the case where the average particle size of the fine PPS resin particles is in a range from 0.05 to 0.5 μm, if any of the abovementioned preferred extraction solvents is used, the fine PPS resin particles exist in the upper water layer, and the extraction solvent with a specific gravity larger than that of water exists in the layer below the water layer, the dispersion being separated into two layers. The extraction solvent existing as a separated lower layer component and NMP as the organic solvent existing in the extraction solvent are separated from the water layer containing the fine PPS resin particles. For further removing the NMP remaining in the water layer containing the fine PPS resin particles, the extraction solvent can be added again, to repeat the separation operation till a desired NMP concentration is reached, for obtaining an aqueous dispersion of fine PPS resin particles with an average particle size of 0.05 to 0.5 μm. However, if the extraction solvent is such that the amount of water dissolved in 100 g of the extraction solvent is more than about 1 g at 25° C., the fine PPS resin particles are distributed into both the water later and the extraction solvent layer, to make the entire liquid white turbid, making the interface unclear, thus making it difficult to separate. If the average particle size of the fine PPS resin particles is in a range from 0.05 to 0.5 μm, the outer surface area of the fine particles is so large that the affinity between the fine PPS resin particles and water is enhanced. Therefore, in the case of an extraction solvent in which water is less likely to be dissolved, the fine PPS resin particles exist in the water layer, and in the case of an extraction solvent in which water is likely to be dissolved, the fine PPS resin particles are distributed also into the extraction solvent layer together with water. As a result, it is estimated that the entire liquid becomes white turbid and that the interface becomes unclear, making separation difficult. The aqueous dispersion of the fine PPS resin particles prepared as described above can be used as it is, but a surfactant can also be added for preventing the cohesion with the lapse of time. Meanwhile, as the surfactant to be added, one or more surfactants can be selected from the surfactants enumerated for the aforementioned dissolution step.

[Filtration/Isolation Step]

The fine PPS resin particle dispersion or suspension obtained in the abovementioned precipitation step can be mechanically ground or mechanically dispersed as it is or after adding a surfactant, to obtain a fine PPS resin particle dispersion. As another method, the dispersion medium can also be replaced by a new dispersion medium, before mechanical grinding or mechanical dispersion is performed. Especially fine PPS resin particles of less than 1 μm are likely to cohere with each other for growing into coarse particles, and in order to obtain a finer and more stable PPS resin particles, it is preferred to perform mechanical dispersion. For replacing the dispersion medium by a new one, the dispersion or suspension is once separated into a solid and a liquid, for isolating the fine PPS resin particles. The method for isolating the fine PPS resin particles can be a publicly known conventional solid liquid separation method such as filtration, centrifugal separation or centrifugal filtration. However, in order to efficiently isolate fine PPS resin particles of less than 1 μm by the operation of solid liquid separation, it is desirable to increase the particle size by cohesion and to subsequently perform solid liquid separation by filtration or centrifugal separation, etc. The method for increasing the particle size by cohesion can be a natural cohesion method for causing cohesion with lapse of time, a cohesion method by heating or a cohesion method using a cohering agent such as a salting-out agent, and if any of these cohesion methods is used, cohesive particles with a large particle size suitable for an industrial solid liquid separation method can be obtained. In this case, it is preferred that the average particle size of the cohesive particles is 5 to 50 μm (the particle size measured by the method described later).

Particularly in the case of a natural cohesion method, the flushed liquid is allowed to stand for one day or more, or the flushed liquid that has been allowed to stand for one day can be heated at 50° C. to 100° C., to be shortened in cohesion time. In the case of salting-out, for example, an inorganic salt such as sodium chloride is added by 0.1 to 1000 mass %, preferably about 0.5 to about 500 mass % to 1 part by mass of the fine PPS resin particles, to obtain cohesive particles with a larger particle size. Particularly for example, an inorganic salt is added directly into the abovementioned dispersion or suspension, or a solution containing 0.1 to 20 mass % of the abovementioned inorganic salt is added. It is preferred that the solvent for dissolving the inorganic salt is water. Further, the inorganic salt can also be dissolved beforehand in the solvent for precipitating fine PPS resin particles in the receiving vessel when the flush cooling is performed. In this case, it is preferred that the solvent for precipitating fine PPS resin particles is water. The amount of the inorganic salt added is 0.1 mass % or more per 1 part by mass of the fine PPS resin particles, and not larger than the saturated dissolved amount in the solvent for precipitating fine PPS resin particles. If the fine PPS resin particles obtained by flush cooling as in this invention is made to cohere with each other by any of these methods, solid liquid separation can be facilitated. Further, even if the fine PPS resin particles are made to cohere with each other by any of these methods, the fine PPS resin particles can be easily re-dispersed.

The abovementioned solid liquid separation method can be any method of filtration, centrifugal separation, etc. For filtration or centrifugal separation, a membrane filter (filtration) or filter cloth (filtration, centrifugal separation), etc. can be used. The meshes of the filter can be decided, as appropriate, in response to the particle size of the fine PPS resin particles to be obtained. A membrane filter of usually about 0.1 to about 50 µm or a filter cloth with an air permeability of 5 $cm^3/cm^2 \cdot sec$ at 124.5 Pa or less can be used. At the time of solid liquid separation, as required, the fine PPS resin articles can also be washed by the dispersion medium to be used in the subsequent dispersion step.

[Grinding Step]

The fine PPS resin particles obtained by the above-mentioned filtration/isolation step can be further mechanically ground to obtain further finer particles. It is preferred that the fine PPS resin particles used in the grinding step are washed in the filtration/isolation step by the dispersion medium to be used in the grinding step. Further, if the fine PPS resin particles are dried in the filtration/isolation step, they are hard to be ground. Therefore, in order to obtain fine PPS resin particles with an average particle size of 1 µm or less by grinding, it is necessary that the fine PPS resin particles are made to contain a solvent or dispersion medium. It is preferred that the fine PPS resin particles used in the grinding step contain 50 mass % or more of a solvent or dispersion medium.

Meanwhile, in this invention, it is determined that grinding has been accomplished in the case where the average primary particle size after grinding becomes smaller than that before grinding. Particularly, the particle sizes of arbitrary 100 particles are measured among the fine PPS resin particles observed by a scanning electron microscope (hereinafter referred to as SEM), and the mean value is employed as the average primary particle size. It is determined that grinding has been accomplished in the case where the average particle size or average primary particle size after grinding becomes smaller than the average primary particle size before grinding.

As the solution to be supplied for mechanical grinding, it is preferred to use a solution obtained by adding fine PPS resin particles and a surfactant to a dispersion medium beforehand and dispersing the mixture using a homogenizer or the like. As the surfactant used for mechanical grinding, one or more surfactants can be selected from the surfactants enumerated for the aforementioned dissolution step, but a surfactant with a phenyl group at one end is preferred in view of inhibiting the cohesion and settlement of the obtained fine PPS resin particle dispersion, and stabilizing dispersibility. In this case, "having a phenyl group at one end" refers to having a phenyl group at an end portion of the molecule of the surfactant. In this invention, such a surfactant is most preferred, but a surfactant in which the phenyl group is substituted by a substituent group with 1 to 12 carbon atoms can also be used. The substituent group on the phenyl group can be a straight chain saturated hydrocarbon group, straight chain unsaturated hydrocarbon group, branched saturated hydrocarbon group or branched unsaturated hydrocarbon group, etc., preferably a straight chain saturated hydrocarbon group, straight chain unsaturated hydrocarbon group, branched saturated hydrocarbon group or branched unsaturated hydrocarbon group respectively with 1 to 6 carbon atoms.

The surfactant having a phenyl group used here is only required to have a benzene ring in the molecule, and it can also be a condensed ring such as a naphthalene ring. Examples of an anionic surfactant having a phenyl group include sodium alkylbenzenesulfonates, sodium alkylnaphthalenesulfonates, sodium alkyldiphenylethersulfonates, etc.

Examples of a cationic surfactant having a phenyl group include alkyldimethylbenzylammonium chlorides, etc.

Examples of a nonionic surfactant having a phenyl group include polyoxyethylene alkyl phenyl ethers, polyoxyethylene monobenzyl phenyl ether, polyoxyethylene dibenzyl phenyl ether, polyoxyethylene tribenzyl phenyl ether, polyoxyethylene monostyryl phenyl ether, polyoxyethylene distyryl phenyl ether, polyoxyethylene tristyryl phenyl ether, polyoxyethylene bisphenyl ether, polyoxyethylene phenoxy phenyl ether, polyoxyethylene cumyl phenyl ether, etc. Meanwhile, the alkyl in this case is preferably a straight chain saturated hydrocarbon group or branched saturated hydrocarbon group respectively with 1 to 30 carbon atoms.

The added amount of the surfactant having a phenyl group is 0.01 to 2.0 times the mass of the fine PPS resin particles. A preferred range is 0.05 to 1.5 times, and a more preferred range is 0.05 to 1.0 time. If the amount of the surfactant used is kept in this range, the fine PPS resin particles made finer by mechanical grinding can be dispersed into the dispersion medium very efficiently and uniformly.

As the method for adding the surfactant having a phenyl group, all the amount of it can be added into the dispersion medium together with the fine PPS resin particles before mechanical grinding, but it can also be added successively at the time of mechanical grinding. The dispersion medium used in this case is changed in response to the purpose of using the fine PPS resin particle dispersion. For example, at least one solvent selected from the following can be used; aliphatic hydrocarbon-based solvents such as pentane, hexane, heptane, octane, cyclohexane, cyclopentane, decane, dodecane, tridecane and tetradecane, aromatic hydrocarbon-based solvents such as benzene, toluene, xylene and 2-methylnaphthalene, ester-based solvents such as ethyl acetate, methyl acetate, butyl acetate, butyl propionate and butyl butyrate, halogen-based solvents such as chloroform, bromoform, methylene chloride, 1,2-dichloroethane, 1,1,1-trichloroethane, chlorobenzene, o-dichlorobenzene, p-dichlorobenzene, 2,6-dichlorotoluene, 1-chloronaphthalene and hexafluoroisopropanol, ketone-based solvents such as acetone, methyl ethyl ketone, methyl isobutyl ketone and methyl butyl ketone, alcohol-based solvents such as methanol, ethanol, isopropanol and n-propanol, N-alkylpyrrolidinone-based solvents such as NMP and N-ethyl-2-pyrrolidinone, N-alkylcaprolactam-based solvents such as N-methyl-ε-caprolactam and N-ethyl-ε-caprolactam, polar solvents such as 1,3-dimethyl-2-imidazolidinone, N,N-dimethylacetamide, DMF, hexamethylphosphoric triamide, DMSO, dimethylsulfone and tetramethylenesulfone, ether-based solvents such as diethyl ether, tetrahydrofuran, diisopropyl ether, dioxane, diglyme and dimethoxyethane and water.

The concentration of the fine PPS resin particles supplied into a mechanical grinder varies depending on the desired concentration of the fine PPS resin particle dispersion, but usually 1 mass % to 20 mass %. If the concentration is too low, the grinding efficiency is low, and it is too high, the viscosity of the liquid to be ground rises to lower not only working efficiency but also grinding efficiency. Before supplying into the mechanical grinder, the fine PPS resin particles and the surfactant having a phenyl group are added to the dispersion medium, and the mixture is sufficiently dispersed using a homogenizer or ultrasonic irradiation, etc. In this case, if cohesive particles are likely to be mixed, it is preferred to filter the aforementioned dispersion by a sieve or the like, to remove large cohesive particles before supplying the dispersion to the mechanical grinder.

The mechanical grinder used in this case can be a ball mill, bead mill, sand mill, colloid mill, or wet atomization unit, etc.

For efficiently producing an intended dispersion of fine PPS resin particles of 1 μm or less, a bead mill packed with beads of 1 mm or less can be preferably used. The abovementioned grinding allows the production of fine PPS resin particles with an average particle size of usually 1 μm or less, preferably 0.5 μm or less.

[Dispersion Step]

If the fine PPS resin particles obtained by the above-mentioned filtration/isolation step are re-dispersed by mechanical dispersion, a further finer PPS resin particle dispersion can be obtained. As the fine PPS resin particles used for the dispersion step, it is preferred that the fine PPS resin particles are washed in the filtration/isolation step by the dispersion medium to be used in the dispersion step. Further, if the fine PPS resin particles are dried in the filtration/isolation step, they are hard to be dispersed. Therefore, in order to obtain fine PPS resin particles with an average particle size of 1 μm or less by dispersion, it is necessary that the fine PPS resin particles are made to contain a solvent or dispersion medium. It is preferred that the fine PPS resin particles used in the dispersion step are made to contain 50 mass % or more of a solvent or dispersion medium.

Meanwhile, it is determined that the dispersion in the dispersion step has been accomplished in the case where though the average particle size after dispersion becomes smaller than the average particle before dispersion, the average primary particle size after dispersion remains the same as the average primary particle size before dispersion. Particularly, the particle sizes of arbitrary 100 fine particles are measured among the fine PPS resin particles observed by a scanning electron microscope (hereinafter referred to as SEM), and the mean value is employed as the average primary particle size.

The dispersion or suspension obtained by flush cooling can also be directly supplied to the dispersion step. A solvent can be added to the dispersion or suspension, or the dispersion or suspension can also be concentrated to adjust the concentration of fine PPS resin particles or to adjust the concentration of the surfactant contained as an arbitrary ingredient. Further, a mixture obtained by adding a surfactant and a dispersion medium to the fine PPS resin particles obtained by solid liquid separation or the like can also be supplied to the dispersion step.

In the case where solid liquid separation is performed once to isolate the fine PPS resin particles, the medium that can be a new dispersion medium can be the same dispersion medium as used for the abovementioned grinding step. For example, at least one solvent selected from the following can be used; aliphatic hydrocarbon-based solvents such as pentane, hexane, heptane, octane, cyclohexane, cyclopentane, decane, dodecane, tridecane and tetradecane, aromatic hydrocarbon-based solvents such as benzene, toluene, xylene and 2-methylnaphthalene, ester-based solvents such as ethyl acetate, methyl acetate, butyl acetate, butyl propionate and butyl butyrate, halogen-based solvents such as chloroform, bromoform, methylene chloride, 1,2-dichloroethane, 1,1,1-trichloroethane, chlorobenzene, o-dichlorobenzene, p-dichlorobenzene, 2,6-dichlorotoluene, 1-chloronaphthalene and hexafluoroisopropanol, ketone-based solvents such as acetone, methyl ethyl ketone, methyl isobutyl ketone and methyl butyl ketone, alcohol-based solvents such as methanol, ethanol, isopropanol and n-propanol, N-alkylpyrrolidinone-based solvents such as NMP and N-ethyl-2-pyrrolidinone, N-alkylcaprolactam-based solvents such as N-methyl-ε-caprolactam and N-ethyl-ε-caprolactam, polar solvents such as 1,3-dimethyl-2-imidazolidinone, N,N-dimethylacetamide, DMF, hexamethylphosphoric triamide, DMSO, dimethylsulfone and tetramethylenesulfone, ether-based solvents such as diethyl ether, tetrahydrofuran, diisopropyl ether, dioxane, diglyme and dimethoxyethane and water. In view of environment and safety, water is most preferred.

In the case where solid liquid separation is performed to isolate the fine PPS resin particles, a surfactant is added for inhibiting the cohesion of the fine PPS resin particles produced by mechanical dispersion and for enhancing the dispersibility into the dispersion medium. In the case where the dispersion or suspension obtained by flush cooling is used in the dispersion step and where it contains the surfactant used in the dissolution step or precipitation step, a new surfactant is added as required. The surfactant can be added either before or after mechanical dispersion. However, in order to prevent the cohesion of fine particles during mechanical dispersion, it is preferred to add before dispersion or add before and during dispersion.

As the surfactant, any of the surfactants as enumerated for the dissolution step, precipitation step and grinding step can be preferably used. The same surfactant as that used for any of the aforementioned steps can be used or any other surfactant can also be used.

The added amount of the surfactant is 0.01 to 100 parts by mass per 100 parts by mass of the fine PPS resin particles. A preferred range is 0.5 to 100 parts by mass, and a more preferred range is 1 to 100 parts by mass. If an amount in this range of the surfactant is used, the fine PPS resin particles obtained by mechanical dispersion can be very efficiently and uniformly dispersed into the dispersion medium. Further, even in the case where the liquid obtained by flush cooling is used as it is as the dispersion, the amount of the surfactant should be adjusted to keep the content in the abovementioned range.

It is preferred that the content of the fine PPS resin particles in the fine PPS resin particle dispersion or suspension to be mechanically dispersed is in a range from 1 to 50 parts by mass per 100 parts by mass of the dispersion medium. An especially preferred range is 1 to 30 parts by mass.

The fine PPS resin particle dispersion or suspension having the abovementioned fine PPS resin particles dispersed therein is mechanically dispersed till the average particle size measured by the measuring method described later becomes 500 nm or less. It is preferred to perform the mechanical dispersion till the average particle size after separation of coarse particles becomes 350 nm or less. The lower limit is not especially limited, but in view of cohesion, it is preferred that the average particle size is 100 nm or more. As the mechanical dispersion apparatus, a commercially available dispersion apparatus can be used. Especially as a mechanical dispersion apparatus suitable for efficiently dispersing fine PPS resin particles for preparing a dispersion of fine PPS resin particles with a small particle size, an ultrasonic dispersion apparatus, ball mill, bead mill, sand mill, colloid mill or wet atomization unit (for example, atomization unit produced by Sugino Machine Limited) can be used. Among them, an apparatus selected from an ultrasonic dispersion apparatus, bead mill, colloid mill and wet atomization unit is preferred. In general, if the dispersing force of mechanical dispersion is larger and the dispersion time is longer, then the average particle size of the obtained fine particles tend to be smaller. However, if the dispersing force is too large or if the dispersion time is too long, re-cohesion is likely to occur. Therefore, they are controlled in the respectively appropriate ranges. For example, in the case of a bead mill, the particle size can be controlled by selecting the bead diameter and the quantity of beads and adjusting the peripheral speed, and in the case of an ultrasonic dispersion apparatus, the particle size can be controlled by selecting the ultrasonic frequency and adjusting the ultrasonic output.

Even a fine PPS resin particle dispersion may contain coarse particles and sediments as the case may be. In this case, the dispersed portion separated from the coarse particles and sediments can be used. For obtaining the dispersion alone, it is only required to separate the dispersed portion from the coarse particles and sediments, and for this purpose, decantation, filtration, centrifugal separation or the like can be performed to remove the coarse particles and the sediments.

By the abovementioned operation, fine PPS resin particles with an average particle size of 500 nm or less, especially with an average particle size of 100 to 350 nm can be obtained.

Even if a dispersion of such fine PPS resin particles is allowed to stand at room temperature (25° C.) for 24 hours, the fine PPS resin particles do not settle out, and can be used as an especially useful additive in the fields of paints, adhesion and polymer compounds.

EXAMPLES

[Measurement of Average Particle Size]

The average particle size of fine PPS resin particles was measured by laser diffraction/light scattering particle size distribution measuring instrument MT3300EXII produced by Nikkiso Co., Ltd., using an aqueous solution containing 0.5 mass % of polyoxyethylene cumyl phenyl ether (trade name Nonal 912A produced by Toho Chemical Industry Co., Ltd.; hereinafter referred to as Nonal 912A) as the dispersion medium. Particularly, with the total volume of the fine particles obtained by analyzing the scattered light of laser by Microtrack method as 100%, the cumulative curve was obtained, and the particle size corresponding to the point of 50% in the cumulative curve (median diameter: d50) was employed as the average particle size of the fine particles.

[Calculation of Standard Deviation]

The standard deviation (SD) in this invention was calculated from the cumulative curve obtained when the abovementioned average particle size was measured. Particularly, with the total volume of the particles obtained by analyzing the scattered light of laser by Microtrack method as 100%, the cumulative curve was obtained, and with the particle size at the point of 84% on the cumulative curve as d84% (μm) and with the particle size at the point of 16% on the cumulative curve as d16% (μm), the value obtained from the following formula was employed as the standard deviation (SD).

$$SD=(d84\%-d16\%)/2 (\mu m)$$

[Calculation of Variation Coefficient of Average Particle Size]

The variation coefficient (CV) of the average particle size in this invention was obtained from the following formulae (1) to (3) using the values of the particle size distribution obtained by the abovementioned laser diffraction/light scattering particle size distribution measuring instrument MT3300EXII produced by Nikkiso Co., Ltd. Meanwhile, the particle sizes of respective samples and data numbers are the values automatically calculated by Data Management System 2 ver10.4.0-225A contained in MT3300EXII.

[Numerical Formulae 1]

(Dispersion)

$$\sigma^2=(1/N)\Sigma(X_i-\overline{X})^2 \quad \text{Equation (1)}$$

X: particle size, $\overline{X}$: average particle size, N: measurement data numbers (Standard Deviation)

$$\sigma=\sqrt{(\sigma^2)} \quad \text{Equation (2)}$$

(Variation Coefficient)

$$CV=\sigma/\overline{X} \quad \text{Equation (3):}$$

[Measurement of Average Primary Particle Size]

As the average primary particle size of this invention, arbitrary 100 particles were selected from the image obtained by scanning electron microscope JEOL JMS-6400F produced by JEOL Ltd., and the largest length of each particle was measured as the particle size, the mean value of the lengths being employed as the average primary particle size.

[Calculation of Variation Coefficient of Average Primary Particle Size]

As the variation coefficient (CV) of the average primary particle size in this invention, the values of the particle size distribution obtained by measuring the particle sizes of the arbitrary 100 particles selected from the image obtained by scanning electron microscope JEOL JMS-6700F produced by JEOL Ltd. were used to obtain the variation coefficient from the above-mentioned formulae (1) to (3).

[Bead Milling]

For bead milling, bead mill "Ultra Apex Mill" UAM-015 produced by Kotobuki Industries Co., Ltd. or bead mill DMS-65 produced by Ashizawa Fineteck Ltd. was packed with a predetermined quantity of 50 μm zirconia beads produced by Tosoh Corp. and operated in circulation mode.

[Ultrasonic Dispersion]

For ultrasonic dispersion, ultrasonic homogenizer US-300T (ultrasonic oscillator: rated output 300 W, oscillation frequency 19.5 kHz±1 kHz (automatic frequency tracking type), ultrasonic transducer: φ26 mm PZT (bolt-clamped electrostrictive) vibrator element) produced by Nippon Seiki Co., Ltd. was used and an ultrasonic oscillator chip adjusted to give a predetermined output was placed in a fine PPS resin particle dispersion (suspension).

[Measurement of BET Specific Surface Area]

The BET specific surface area of fine PPS resin particles was measured by using an automatic gas/vapor adsorption amount measuring instrument produced by BEL Japan, Inc. Particularly, at first, vacuum heat drying treatment was performed as pretreatment, and subsequently adsorption-desorption isotherms with nitrogen as the adsorption probe were measured and analyzed to obtain the BET specific surface area of the fine particles.

Example 1

[Dissolution Step]

A 1,000 ml autoclave as a dissolution vessel was equipped with a stirrer, temperature meter and internal solution ejection pipe. As the ejection pipe, a connection pipe allowing a valve to be opened and closed was used. Further, as a receiving vessel for flush cooling, a 1,000 autoclave was equipped with a stirrer, condenser and gas vent pipe, and connected with the other end of the connection pipe from the aforementioned dissolution vessel.

The dissolution vessel was charged with 10.0 g of a PPS resin powder (grade M3910, average particle size 27 μm, produced by Toray Industries, Inc.; this powder was used in the following examples), 6.25 g of Nonal 912A as a surfactant and 490 g of NMP (produced by Kanto Chemical Co., Inc.), and the atmosphere was replaced by nitrogen, the dissolution vessel being sealed. With stirring, the internal temperature was raised to 280° C., and stirring was continued for further 5 hours. The internal pressure (gauge pressure) in this case was 0.4 MPa.

[Precipitation Step]

The aforementioned receiving tank was cooled in icy water, and with stirring, a slight amount of nitrogen gas was circulated. The valve of the internal connection pipe of the aforementioned dissolution vessel was opened to transfer the solution into the receiving vessel of atmospheric pressure in about 1 minute. After confirming that the liquid temperature became lower than 40° C., stirring was stopped and the receiving vessel was opened. The NMP suspension of fine PPS resin particles in the receiving vessel was filtered by a 38 μm sieve, to remove slightly contained coarse particles, for obtaining a fine PPS resin particle dispersion. The particle size distribution of the dispersion in NMP was measured and as a result the average particle size was 9.35 μm.

Then, the fine PPS resin particle suspension was centrifugally separated at 4,000 rpm for 10 minutes, while being kept at lower than 20° C. The NMP as the supernatant solution was separated, and 200 g of 1.25 mass % Nonal 912A aqueous solution was added to the fine PPS resin particles settling below, the mixture being stirred and centrifugally separated again at 4,000 rpm for 10 minutes. Subsequently the supernatant solution was removed to obtain fine PPS resin particles. The fine PPS resin particles were dispersed into 0.5 mass % Nonal 912A aqueous solution, and the particle size distribution of the fine PPS resin particle dispersion was measured. As a result, the average particle size was 7.36 μm and the average primary particle size was 5.91 μm.

[Grinding Step]

The aforementioned fine PPS resin particles were suspended in 400 ml of 1.25 mass % Nonal 912A aqueous solution, to prepare 1.5 mass % fine PPS resin particle suspension. While the liquid temperature was kept at lower than 20° C., the fine PPS resin particle suspension was ground by a bead mill (Ultra Apex Mill UAM-015 produced by Kotobuki Industries Co., Ltd., packed with 80% of 50 μm zirconia beads produced by Tosoh Corporation) for 60 minutes. The particle size distribution of the obtained fine PPS resin particle dispersion was measured, and as a result, the average particle size of the fine PPS resin particles was 0.20 μm. The fine PPS resin particle dispersion was allowed to stand at room temperature (25° C.) for 24 hours and visually observed. The fine PPS resin particles did not settle.

Example 2

Ten grams of the PPS resin powder, 6.25 g of Nonal 912A and 490 g of NMP were used, and flush cooling was performed as described for Example 1. The obtained flushed liquid was centrifugally separated, and the supernatant solution was removed. To the residue, ion exchange water was added to make a suspension which was then centrifugally separated. This operation was repeated twice, to obtain 10 g of fine PPS resin particles. The average particle size of the fine PPS resin particles was 7.8 μm, and the average primary particle size was 5.6 μm. The specific surface area measured by the BET method was 11 $m^2/g$. Six point two five grams of the obtained fine PPS resin particles were dispersed into 400 g of 1.25 mass % Nonal 912A aqueous solution, to prepare a fine PPS resin particle dispersion. The fine PPS resin particle dispersion was ground by a bead mill for 1 hour as described for Example 1, to obtain a fine PPS resin particle dispersion. The average particle size of the fine PPS resin particle dispersion was 200 nm. The fine PPS resin particle dispersion was allowed to stand at room temperature (25°) for 24 hours and visually observed. The fine PPS resin particles did not settle.

Example 3

Fifteen grams of the PPS resin powder, 6.25 g of Nonal 912A and 485 g of NMP were used, and the dissolution step and the precipitation step were performed as described for Example 1, to obtain a fine PPS resin particle dispersion. The particle size distribution of the obtained fine PPS resin particles was measured. As a result, the average particle size was 10.64 μm, and the average primary particle size was 6.8 μm. In succession, as described for Example 1, bead milling was performed to obtain a fine PPS resin particle dispersion. The average particle size of the fine PPS resin particle dispersion was 0.30 μm. The fine PPS resin particle dispersion was allowed to stand at room temperature (25° C.) for 24 hours and visually observed. The fine PPS resin particles did not settle.

Example 4

Fifteen grams of the PPS resin powder and 485 g of NMP were used, and as described for Example 1, flush cooling was performed. The obtained flushed liquid was centrifugally separated, and the supernatant solution was removed. To the residue, ion exchange water was added to make a suspension which was then centrifugally separated. This operation was repeated twice, to obtain 15 g of fine PPS resin particles. The average particle size of the fine PPS resin particles was 10.04 μm, and the average primary particle size was 7.6 μm. The specific surface area measured by the BET method was 12 $m^2/g$. Six point two five grams of the obtained fine PPS resin particles were dispersed into 400 g of 1.25 mass % Nonal 912A aqueous solution, to prepare a fine PPS resin particle dispersion. In succession, as described for Example 1, bead milling was performed to obtain a fine PPS resin particle dispersion. The average particle size of the fine PPS resin particle dispersion was 300 nm. The fine PPS resin particle dispersion was allowed to stand at room temperature (25° C.) for 24 hours and visually observed. The fine PPS resin particles did not settle.

Example 5

As described for Example 1, 6.1 g of the PPS resin powder and 490 g of NMP were used, and with stirring, the internal temperature was raised to 280° C. Then, stirring was continued for further 5 hours. Subsequently, nitrogen gas was pressed in up to an internal pressure (gauge pressure) of 2 MPa, to raise the internal temperature to 310° C. The valve of the internal connection pipe of the dissolution vessel was opened, and as described for Example 1, flush cooling was performed to obtain a fine PPS resin particle dispersion. The average particle size of the obtained tine PPS resin particles was 1.36 μm. Further, the fine PPS resin particle dispersion was allowed to stand at room temperature (25° C.) for 24 hours and visually observed. The fine PPS resin particles did not settle.

Example 6

[Dissolution Step]

Fourteen point seven grams of the PPS resin powder and 490 g of NMP were used to perform the dissolution step as described for Example 1.

[Precipitation Step]

The receiving vessel was charged with 490 g of water, and cooled in icy water, and with stirring, a slight amount of nitrogen gas was circulated. The outlet of the connection pipe in this case was placed in water. In succession, flush cooling was performed as described for Example 1, to obtain a fine PPS resin particle dispersion. The average particle size of the fine PPS resin particles in the obtained fine PPS resin particle dispersion was 0.14 μm, and the standard deviation was 0.05 μm. The fine PPS resin particle dispersion was allowed to stand at room temperature (25° C.) for 24 hours and visually observed. The fine PPS resin particles did not settle.

Example 7

Six point one grams of Nonal 912A was added to the water used as the dispersion medium to be charged into the receiving vessel, and operation was performed as described for Example 6. The average particle size of the fine PPS resin particles in the obtained fine PPS resin particle dispersion was 0.14 μm, and the standard deviation was 0.05 μm. The fine PPS resin particle dispersion was allowed to stand at room temperature for 24 hours and visually observed. The fine PPS resin particles did not settle.

Example 8

The same equipment as that used in Example 1 was used, except that the outlet of the connection pipe of the receiving vessel was installed at a position above the water surface. The receiving vessel was charged with 490 g of water used as the dispersion medium and 6.1 g of Nonal 912A, and operation was performed as described for Example 6. The average particle size of the obtained fine PPS resin particles was 11.4 μm, and the standard deviation was 6.82 μm. In succession, bead milling was performed as described for Example 1, to obtain a fine PPS resin particle dispersion. The average particle size of the fine PPS resin particle dispersion was 320 nm. Further, the fine PPS resin particle dispersion was allowed to stand at room temperature)(25° for 24 hours and visually observed. The fine PPS resin particles did not settle.

Example 9

As the dispersion medium to be charged into the receiving vessel, 490 g of NMP was used, and operation was performed as described for Example 6. The average particle size of the obtained fine PPS resin particles was 9.88 μm, and the standard deviation was 4.50 μm. In succession, bead milling was performed as described for Example 1, to obtain a fine PPS resin particle dispersion. The average particle size of the fine PPS resin particle dispersion was 450 nm. Further, the fine PPS resin particle dispersion was allowed to stand at room temperature (25° C.) for 24 hours and visually observed. The fine PPS resin particles did not settle.

Example 10

[Dissolution Step]
Fourteen point seven grams of the PPS resin powder and 490 g of NMP were used, and operation was performed as described for Example 1.
[Precipitation Step]
The receiving vessel was charged with 490 g of water, and operation was performed as described for Example 6. The average particle size of the obtained flushed liquid was 0.1 μm. To the suspension, 2 mass % sodium chloride aqueous solution (the amount of sodium chloride based on the amount of the fine PPS resin particles was 200 mass %), the amount of which was equal to that of the suspension, was added for salting out, and the mixture was filtered by a 0.1 μm membrane filter. The average particle size in this case was 29 μm. The obtained solid matter was suspended in 150 g of ion exchange water, and the suspension was filtered by a 0.1 μm membrane filter. The same operation was performed twice, to obtain hydrous fine PPS resin particles (53.9 g, PPS content 20.0 wt %).
[Dispersion Step]
To 50 g of the aforementioned hydrous fine PPS resin particles (PPS content 10.0 g), 2.0 g of Nonal 912A (ratio to PPS, 20 mass %) and 148 g of ion exchange water were added to prepare 5 mass % fine PPS resin particle suspension, and subsequently it was preliminarily dispersed by a homomixer. The suspension was ultrasonically treated (output 90 W, 20 minutes), and subsequently a centrifugal separator was used (1,090 g, 5 minutes) to separate coarse particles, for obtaining a fine PPS resin particle aqueous dispersion with an average particle size of 181 nm and a variation coefficient of 47%. The average primary particle size before ultrasonic dispersion was 83 nm, and the variation coefficient was 21%, the average primary particle size after ultrasonic dispersion being 80 nm. The fine PPS resin particle dispersion was allowed to stand at room temperature (25° C.) for 24 hours and visually observed. The fine PPS resin particles did not settle.

Example 11

The receiving vessel was charged with 196 g of water, and flush cooling was performed as described for Example 10. The average particle size of the flushed liquid was 9 μm. To the flushed liquid, ion exchange water (685 g) was added, and the mixture was allowed to stand for 2 days and subsequently filtered by a 0.1 μm membrane filter. The residue was allowed to stand for 2 days, and the average particle size was 21 μm. It was washed with water as described for Example 10, and a dispersion step was performed to obtain a fine PPS resin particle dispersion with an average particle size of 176 nm and a variation coefficient of 75%. The average primary particle size before ultrasonic dispersion was 98 nm and the variation coefficient was 25%, the average primary particle size after ultrasonic dispersion being 92 nm. The fine PPS resin particle dispersion was allowed to stand at room temperature (25° C.) for 24 hours and visually observed. The fine PPS resin particles did not settle.

Example 12

The receiving vessel was charged with 196 g of water and 98 g of NMP, and flush cooling was performed as described for Example 10. The average particle size of the flushed liquid was 18 μm. The flushed liquid was allowed to stand for 2 days to be larger in particle size, being followed by filtration and washing with water. The average particle size after the standing for 2 days was 30 μm. A dispersion step was performed as described for Example 10, except that polyoxyethylene stearyl ether (20 moles of ethylene oxide adduct) was used as a dispersing agent, to obtain a fine PPS resin particle dispersion with an average particle size of 163 nm and a variation coefficient of 60%. The average primary particle size before ultrasonic dispersion was 102 nm and the variation coefficient was 25%, the average primary particle size after ultrasonic dispersion being 101 nm. The fine PPS resin particle dispersion was allowed to stand at room temperature (25° C.) for 24 hours and visually observed. The fine PPS resin particles did not settle.

Example 13

The receiving vessel was charged with 196 g of water and 147 g of NMP, and flush cooling was performed as described for Example 10. The average particle size of the flushed liquid was 10 μm. The flushed liquid was allowed to stand for 2 days, being followed by filtration and washing with water. The average particle size after the standing for 2 days was 17 μm. A dispersion step was performed as described for Example 10, except that polyoxyethylene stearyl ether (20 moles of ethylene oxide adduct) was used as a dispersing agent, to obtain a fine PPS resin particle dispersion with an average particle size of 155 nm and a variation coefficient of 53%. The average primary particle size before ultrasonic dispersion was 97 nm and the variation coefficient was 25%, the average primary particle size after ultrasonic dispersion being 99 nm. The fine PPS resin particle dispersion was allowed to stand at room temperature (25° C.) for 24 hours and visually observed. The fine PPS resin particles did not settle.

Example 14

The receiving vessel was charged with 294 g of water and 73.5 g of NMP, and flush cooling was performed as described for Example 10. The average particle size of the flushed liquid was 11 μm. The flushed liquid was heated at 80° C. for 1 hour, being followed by filtration and washing with water. The average particle size after heating was 18 μm. A dispersion step was performed as described for Example 10, except that polyoxyethylene stearyl ether (20 moles of ethylene oxide adduct) was used as the dispersing agent, to obtain a fine PPS resin particle dispersion with an average particle size of 160 nm and a variation coefficient of 58%. The average primary particle size before ultrasonic dispersion was 101 nm and the variation coefficient was 22%, the average primary particle size after ultrasonic dispersion being 105 nm. The fine PPS resin particle dispersion was allowed to stand at room temperature (25° C.) for 24 hours and visually observed. The fine PPS resin particles did not settle.

Example 15

[Dissolution Step]

A 9.8 L autoclave as a dissolution vessel was equipped with a connection pipe in such a manner as to allow a valve to be opened and closed and to locate the end of the pipe in the vessel. Further, as a receiving tank for flush cooling, a 50 L pressure tank was equipped with a stirrer, condenser and gas vent pipe, and the other end of the connection pipe of the aforementioned dissolution vessel was located in the tank. The dissolution vessel was charged with 210 g of the PPS resin powder and 6,790 g of NMP, and the valve of the internal connection pipe was closed, the atmosphere being replaced by nitrogen. With stirring, the internal temperature was raised to 280° C., and subsequently stirring was continued for 1 hour. The internal pressure (gauge pressure) in this case was 0.4 MPa.

[Precipitation Step]

The aforementioned receiving vessel was charged with 2,800 g of water, and the tip of the equipped connection pipe with the receiving vessel was placed in water. The receiving vessel was cooled with ice, and nitrogen gas was circulated. The temperature of the receiving vessel in this case was 5° C. The valve of the connection pipe of the dissolution vessel was opened, for flush-cooling the solution into the water of the receiving vessel. The average particle size of the flushed liquid was 10 μm. The flushed liquid was allowed to stand for 2 days, and subsequently a centrifugal dehydrator was used to perform solid liquid separation, the solid matter being collected by filtration. The average particle size after the standing for 2 days was 26 μm. The solid matter was suspended into 1,800 g of ion exchange water, and the solid matter was collected by a centrifugal dehydrator. The same operation was performed twice, to obtain a hydrous fine PPS resin particles (860 g, PPS content 22.0 wt %). The specific surface area was measured by the BET method and found to be 9.7 $m^2/g$.

[Dispersion Step]

To 68.2 g of the aforementioned hydrous fine PPS resin particles (PPS content 15.0 g), 3.0 g (ratio to PPS 20 mass %) of polyoxyethylene stearyl ether (20 moles of ethylene oxide adduct) and 228.8 g of ion exchange water were added, to prepare 5 mass % fine PPS resin particle suspension which was then preliminarily dispersed by a homomixer. The suspension was treated ultrasonically (output 90 W, 20 minutes), and subsequently a centrifugal separator (1,090 G, 5 minutes) was used to separate coarse particles, for obtaining a fine PPS resin particle dispersion with an average particle size of 197 nm and a variation coefficient of 98%. The average primary particle size before ultrasonic dispersion was 115 nm and the variation coefficient was 29%, the average primary particle size after ultrasonic dispersion being 110 nm. The fine PPS resin particle dispersion was allowed to stand at room temperature (25° C.) for 24 hours and visually observed. The fine PPS resin particles did not settle.

Example 16

The hydrous fine PPS resin particles obtained in the precipitation step of Example 15 were used to perform a dispersion step as described for Example 15, except that the surfactant used in the dispersion step was polyoxyethylene oleyl ether (18 moles of ethylene oxide adduct), to obtain a fine PPS resin particle dispersion with an average particle size of 188 nm and a variation coefficient of 87%. The average primary particle size before ultrasonic dispersion was 115 nm and the variation coefficient was 29%, the average primary particle size after ultrasonic dispersion being 112 nm. The fine PPS resin particle dispersion was allowed to stand at room temperature (25° C.) for 24 hours and visually observed. The fine PPS resin particles did not settle.

Example 17

The hydrous fine PPS resin particles obtained in the precipitation step of Example 15 were used to perform a dispersion step as described for Example 15, except that the surfactant used in the dispersion step was polyoxyethylene oleyl ether (24 moles of ethylene oxide adduct), to obtain a fine PPS resin particle dispersion with an average particle size of 186 nm and a variation coefficient of 87%. The average primary particle size before ultrasonic dispersion was 115 nm and the variation coefficient was 29%, the average primary particle size after ultrasonic dispersion being 109 nm. The fine PPS resin particle dispersion was allowed to stand at room temperature (25° C.) for 24 hours and visually observed. The fine PPS resin particles did not settle.

Examples 18 to 28

Flush cooling was performed as described for Example 10, except that the amount of the water in the receiving vessel was 196 g and that the amount of the PPS resin powder used in the dissolution step and the temperature of the dissolution step were as shown in Table 1. The flushed liquid was allowed to stand for 2 days to be larger in particle size, being followed by filtration and washing with water. Dispersion was performed as in the dispersion step of Example 10. The results are shown in Table 1. The following fine PPS resin particle dispersions were allowed to stand at room temperature (25° C.) for 24 hours and visually observed. The fine PPS resin particles did not settle.

TABLE 1

| Example | 18 | 19 | 20 | 21 | 22 | 23 | 24 | 25 | 26 | 27 | 28 |
|---|---|---|---|---|---|---|---|---|---|---|---|
| Amount of PPS resin powder (g) in dissolution step | 14.7 | 14.7 | 12.25 | 14.7 | 19.6 | 12.25 | 14.7 | 19.6 | 12.25 | 19.6 | 24.5 |
| Dissolving temperature (° C.) | 240 | 250 | 260 | 260 | 260 | 270 | 270 | 270 | 280 | 280 | 280 |
| Average particle size (μm) of flushed liquid | 9 | 8 | 12 | 18 | 16 | 11 | 30 | 24 | 14 | 11 | 5 |
| Average particle size (μm) after standing | 20 | 26 | 27 | 24 | 28 | 23 | 35 | 29 | 18 | 24 | 25 |
| Average particle size (nm) of dispersion | 156 | 170 | 153 | 174 | 152 | 149 | 190 | 162 | 150 | 189 | 222 |
| Variation coefficient (%) of average particle size of dispersion | 45 | 60 | 61 | 56 | 42 | 44 | 78 | 50 | 41 | 64 | 63 |
| Average primary particle size (nm) before dispersion | 94 | 96 | 100 | 102 | 112 | 105 | 105 | 113 | 101 | 126 | 143 |
| Variable coefficient (%) of average primary particle size before dispersion | 24 | 26 | 24 | 23 | 30 | 24 | 21 | 31 | 24 | 37 | 25 |

Example 29

Flush cooling was performed as described for Example 10, except that the amount of the water in the receiving vessel was 500 g, and the amount of the PPS resin powder was 10 g. The flushed liquid was allowed to stand for 2 days to be larger in particle size, being followed by filtration and washing with water. Subsequently dispersion was performed as in the dispersion step of Example 10, to obtain a fine PPS resin particle dispersion with an average particle size of 140 nm and a variation coefficient of 51%. The average primary particle size before ultrasonic dispersion was 92 nm and the variation coefficient was 28%, the average primary particle size after ultrasonic dispersion being 90 nm. The fine PPS resin particle dispersion was allowed to stand at room temperature (25° C.) for 24 hours and visually observed. The fine PPS resin particles did not settle.

Example 30

Flush cooling was performed as described for Example 10, except that the amount of the water in the receiving vessel was 300 g. The flushed liquid was allowed to stand for 2 days to be larger in particle size, being followed by filtration and washing with water. Subsequently dispersion was performed as in the dispersion step of Example 10, to obtain a fine PPS resin particle dispersion with an average particle size of 145 nm and a variation coefficient of 54%. The average primary particle size before ultrasonic dispersion was 90 nm and the variation coefficient was 26%, the average primary particle size after ultrasonic dispersion being 91 nm. The fine PPS resin particle dispersion was allowed to stand at room temperature (25° C.) for 24 hours and visually observed. The fine PPS resin particles did not settle.

Example 31

The hydrous fine PPS resin particles obtained in the precipitation step of Example 15 were used to perform a dispersion step as in the dispersion step of Example 15, except that the surfactant used in the dispersion step was 18.8 g (ratio to PPS 20 mass %) of sodium dodecylbenzenesulfonate (trade name Neopelex G-15, active ingredient 16%, produced by Kao Corporation) and that 213.0 g of ion exchange water was used, to obtain a fine PPS resin particle dispersion with an average particle size of 245 nm and a variation coefficient of 64%. The average primary particle size before ultrasonic dispersion was 115 nm and the variation coefficient was 29%, the average primary particle size after ultrasonic dispersion being 101 nm. The fine PPS resin particle dispersion was allowed to stand at room temperature (25° C.) for 24 hours and visually observed. The fine PPS resin particles did not settle.

Example 32

The hydrous fine PPS resin particles obtained in the precipitation step of Example 15 were used to perform a dispersion step as in the dispersion step of Example 15, except that the surfactant used in the dispersion step was 8.6 g (ratio to PPS 20 mass %) of a sodium alkylnaphthalenesulfonate (trade name Pelex NBL, active ingredient 35%, produced by Kao Corporation) and that 223.2 g of ion exchange water was used, to obtain a fine PPS resin particle dispersion with an average particle size of 254 nm and a variation coefficient of 63%. The average primary particle size before ultrasonic dispersion was 115 nm and the variation coefficient was 29%, the average primary particle size after ultrasonic dispersion being 102 nm. The fine PPS resin particle dispersion was allowed to stand at room temperature (25° C.) for 24 hours and visually observed. The fine PPS resin particles did not settle.

Example 33

[Dissolution Step]
Fourteen point seven grams of the PPS resin powder and 490 g of NMP were used to perform operation as described for Example 10.

[Precipitation Step]

The receiving vessel was charged with 490 g of water to perform operation as described for Example 10. The obtained fine PPS resin particle dispersion contained fine PPS resin particles, NMP and water {NMP:water (ratio by mass)=1:1}, and the average particle size of the fine PPS resin particles in the dispersion was 0.14 μm.

[Extraction Step]

One hundred grams of chloroform (the amount of water capable of being dissolved in 100 g of chloroform at 25° C. is 0.08 g) was added to 100 g of the fine PPS resin particle dispersion at 30° C., and the mixture was stirred. Stirring was stopped in 10 minutes, and the mixture was allowed to stand till an interface could be seen. As a result, the mixture was separated into two layers: the upper white turbid water layer and the lower clear extraction solvent layer. Since the water layer was white turbid, it was determined that fine PPS resin particles existed in the water layer. The fine PPS resin particle aqueous dispersion as the upper layer was recovered. The lower chloroform layer was analyzed by gas chromatography (condition:FID, column DB-WAX 30 m×0.25 mm φ×0.25 μm, air pressure 50 kPa, hydrogen pressure 50 kPa, helium pressure 20 kPa, column temperature 40-180° C., injection temperature 280° C., heating rate 10° C./min). As a result, it was found that the chloroform layer contained 25.8 g of NMP. Since the amount of NMP in the fine PPS resin particle dispersion before the addition of chloroform calculated from the supplied amount was 49.3 g, 23.5 g of NMP was considered to exist in the water layer. The fine PPS resin particle aqueous dispersion was subjected to extraction with chloroform six times repetitively, to remove 48.7 g of NMP. From the result, the NMP concentration in the fine PPS resin particle aqueous dispersion was decided to be 0.75%. The average particle side of the fine PPS resin particles in the obtained PPS aqueous dispersion was 0.14 μm.

Comparative Example 1

A 9.8 L pressure vessel was charged with 62.5 g of the PPS resin powder and 4,937.5 g of NMP (produced by Kanto Chemical Co., Inc.), and degassed and subsequently sealed in nitrogen atmosphere, and the internal temperature was raised to 300° C. The mixture was stirred at 300° C. for 1 hour and subsequently cooled to room temperature (25° C.), taking 4 hours. The reaction solution was filtered by a sieve of 200 μm, and subsequently the filtrate was injected into 10 kg of 5.0 mass % sodium chloride aqueous solution. The mixture was stirred for 30 minutes and centrifugally dehydrated, to obtain a crude hydrous cake. To the obtained crude hydrous cake, about 1 kg of ion exchange water was added, and the mixture was stirred and centrifugally dehydrated. The washing operation was repeated twice, to obtain 206 g of fine PPS resin particles. The average particle size of the fine PPS resin particles was 21 μm and the water content was 76.8 mass % (PPS content 47.7 g, recovery rate 76.3%). The specific surface area measured by the BET method was 13 m$^2$/g. To 64.6 g of the obtained fine PPS resin particles, 0.62 g of Nonal 912A was added, and subsequently the mixture was dispersed into 235 g of 1.25 mass % Nonal 912A aqueous solution, to prepare a fine PPS resin particle dispersion.

The fine PPS resin particle suspension was ground by a bead mill (DMS-65 produced by Ashizawa Fineteck Ltd., 0.05 mm zirconia beads, peripheral speed 14 m/sec) for 2 hours, to obtain a fine PPS resin particle dispersion. The average particle size of the fine PPS resin particles was 15 μm.

Comparative Example 2

Six point zero grams of a PPS resin powder (average particle size 27 μm, BET specific surface area 7 m$^2$/g) was dispersed into 594 g of 5.0 mass % Nonal 912A aqueous solution, to prepare a fine PPS resin particle dispersion. The fine PPS resin particle suspension was ground by a bead mill ("Ultra Apex Mill" produced by Kotobuki Industries, Co., Ltd., 0.05 mm zirconia beads, rotational speed of mill 4,300 rpm) for 1.5 hours, to obtain a fine PPS resin particle dispersion. The average particle size of the fine PPS resin particle dispersion was 19 μm.

[Industrial Applicability]

According to the production process of this invention, narrow in particle size distribution and small in particle size of a fine PPS resin particle dispersion can be very easily obtained. The fine PPS resin particle dispersion obtained like this can be widely used for such applications as adhesives, paints, dispersing agents in printing inks, magnetic recording media, modifying agents of plastics, materials for inter-layer insulation films, etc.

The invention claimed is:

1. A process for producing fine polyphenylene sulfide resin particles comprising the following steps (a) and (b):
    (a) a dissolution step of heating a polyphenylene sulfide resin in an organic solvent to obtain a first solution with the polyphenylene sulfide resin dissolved therein;
    (b) a precipitation step of flush-cooling the first solution to precipitate out the fine particles of the polyphenylene sulfide resin.

2. A process for producing fine polyphenylene sulfide resin particles, according to claim 1, wherein during the precipitation step, the solution is flush-cooled into a solvent in order to precipitate out the fine polyphenylene sulfide resin particles.

3. A process for producing fine polyphenylene sulfide resin particles, according to claim 1, wherein during the precipitation step, the solution is kept at a pressure of 0.2 to 4 MPa (gauge pressure) as it is flush-cooled.

4. A process for producing fine polyphenylene sulfide resin particles, according to claim 1, wherein during the dissolution step, the solution is heated in a range of from 200° C. to 400° C.

5. A process for producing fine polyphenylene sulfide resin particles, according to claim 1, wherein in the dissolution step, N methyl-2-pyrrolidinone is used as the organic solvent.

6. A process for producing fine polyphenylene sulfide resin particles, according to claim 2, wherein in the precipitation step, the solvent for precipitating fine polyphenylene sulfide resin particles is water.

7. A process for producing fine polyphenylene sulfide resin particles, according to claim 1, which further comprises a grinding step wherein a mechanical grinding apparatus grinds the fine polyphenylene sulfide resin particles obtained in the precipitation step to further reduce the particle size thereof and wherein the fine polyphenylene sulfide resin particles are contained in a suspension of a surfactant and a dispersion medium.

8. A process for producing fine polyphenylene sulfide resin particles, according to claim 1, which further comprises an extraction step wherein the organic solvent used in the dissolution step is extracted from the dispersion containing the fine polyphenylene sulfide resin particles obtained in the precipitation step using an extraction solvent.

9. A process for producing fine polyphenylene sulfide resin particles, according to claim 1, wherein the organic solvent used in the dissolution step is N-methyl-2-pyrrolidinone and the solvent used for precipitating fine polyphenylene sulfide resin particles in the precipitation step is water, and wherein the process further comprises an extraction step of extracting N-methyl-2-pyrrolidinone from the dispersion containing the polyphenylene sulfide resin particles obtained in the precipitation step using an extraction solvent.

10. A process for producing fine polyphenylene sulfide resin particles, according to claim 1, which comprises a dispersion step of of mechanically dispersing a suspension containing the fine polyphenylene sulfide resin particles obtained in the precipitation step, wherein the suspension contains a surfactant and a dispersion medium.

11. process for producing fine polyphenylene sulfide resin particles, according to claim 10, wherein the fine polyphenylene sulfide resin particles obtained in the precipitation step are subjected to conditions that cause the particles to cohere to each other so as to increase in particle size, and are subsequently subjected to solid liquid separation in the dispersion step.

12. A process for producing fine polyphenylene sulfide resin particles, according to claim 10, wherein the dispersion medium used in the dispersion step is water.

13. A fine polyphenylene sulfide resin particle dispersion, comprising the fine polyphenylene sulfide resin particles obtained by the process for producing fine polyphenylene sulfide resin particles as set forth in claim 1, a surfactant and a dispersion medium.

14. Fine polyphenylene sulfide resin particles obtained by the process for producing fine polyphenylene sulfide resin particles as set forth claim 1, which have a BET specific surface area of 5 to 20 $m^2/g$ and an average particle size of 20 μm or less.

15. Fine polyphenylene sulfide resin particles with an average particle size of 0.5 μm or less as measured by the laser diffraction/light scattering method, and a variation coefficient of 20 to 100%.

16. Fine polyphenylene sulfide resin particles with an average primary particle size of 0.2 μm or less and a variation coefficient of 10 to 40%.

17. A fine polyphenylene sulfide resin particle dispersion comprising the fine polyphenylene sulfide resin particles as set forth in claim 14 dispersed in a dispersion medium.

18. A process for producing fine polyphenylene sulfide resin particles, according to claim 2, wherein during the precipitation step, the solution is kept at a pressure of 0.2 to 4 MPa (gauge pressure) as it is flush-cooled.

19. A process for producing fine polyphenylene sulfide resin particles, according to claim 11, wherein the dispersion medium used in the dispersion step is water.

20. A fine polyphenylene sulfide resin particle dispersion comprising the fine polyphenylene sulfide resin particles as set forth in claim 15 dispersed in a dispersion medium.

21. A fine polyphenylene sulfide resin particle dispersion comprising the fine polyphenylene sulfide resin particles as set forth in claim 16 dispersed in a dispersion medium.

* * * * *